(12) United States Patent
Pahls et al.

(10) Patent No.: US 12,151,888 B2
(45) Date of Patent: Nov. 26, 2024

(54) MODULAR VERTICAL LIFT SYSTEM

(71) Applicant: INTELLIGRATED HEADQUARTERS, LLC, Mason, OH (US)

(72) Inventors: Justen Pahls, Hamilton, OH (US); Benjamin Hart, Cincinnati, OH (US); Anthony Turco, Liberty Township, OH (US)

(73) Assignee: Intelligrated Headquarters, LLC, Mason, OH (US)

( * ) Notice: Subject to any disclaimer, the term of this patent is extended or adjusted under 35 U.S.C. 154(b) by 0 days.

(21) Appl. No.: 18/441,151

(22) Filed: Feb. 14, 2024

(65) Prior Publication Data

US 2024/0182244 A1 Jun. 6, 2024

Related U.S. Application Data

(63) Continuation of application No. 17/368,143, filed on Jul. 6, 2021, now Pat. No. 11,932,488.

(51) Int. Cl.
*B65G 1/06* (2006.01)
*B66F 7/28* (2006.01)
*B65G 13/00* (2006.01)

(52) U.S. Cl.
CPC .......... *B65G 1/06* (2013.01); *B66F 7/28* (2013.01); *B65G 13/00* (2013.01); *B65G 2203/0283* (2013.01); *B65G 2203/042* (2013.01)

(58) Field of Classification Search
None
See application file for complete search history.

(56) References Cited

U.S. PATENT DOCUMENTS

| | | | |
|---|---|---|---|
| 7,261,509 B2 | 8/2007 | Freudelsperger | |
| 9,463,925 B2 * | 10/2016 | Cyrulik | B65G 1/1373 |
| 10,954,067 B1 | 3/2021 | Theobald et al. | |
| 11,046,514 B2 * | 6/2021 | Hart | F16C 19/06 |
| 2003/0228208 A1 * | 12/2003 | Grond | B65G 1/0471 |
| | | | 414/277 |

(Continued)

FOREIGN PATENT DOCUMENTS

| | | |
|---|---|---|
| CN | 204237082 U | 4/2015 |
| EP | 3527506 A1 | 8/2019 |

(Continued)

OTHER PUBLICATIONS

EP Office Action Mailed on May 6, 2024 for EP Application No. 22180799, 6 page(s).

(Continued)

*Primary Examiner* — Mark C Hageman
(74) *Attorney, Agent, or Firm* — Alston & Bird LLP (57) ABSTRACT

A lift structure of a rack storage system including a pair of vertical post, a pair of guide rail portions stacked one on top of the other, a mounting brace, and a mounting platform attached to the pair of vertical post. The mounting brace includes an adjustment mechanism to adjust an alignment between the pair of guide rail portions fastened together by a clamping plate. A load handling station is secured to the mounting platform to support loads transported to and from the rack storage system, wherein the load handling station is located by locating a position of the mounting platform.

20 Claims, 5 Drawing Sheets

(56) References Cited

U.S. PATENT DOCUMENTS

2007/0166138 A1  7/2007  Brooks
2008/0247848 A1  10/2008  Freudelsperger
2013/0129453 A1  5/2013  Salichs et al.

FOREIGN PATENT DOCUMENTS

WO   2018/224185 A1   12/2018
WO   2021/108827 A1   6/2021

OTHER PUBLICATIONS

European search report Mailed on Dec. 2, 2022 for EP Application No. 22180799.
Examiner Interview Summary Record (PTOL-413) Mailed on Oct. 30, 2023 for U.S. Appl. No. 17/368,143, 2 page(s).
Final Rejection Mailed on Sep. 11, 2023 for U.S. Appl. No. 17/368,143, 8 page(s).
Non-Final Rejection Mailed on Mar. 7, 2023 for U.S. Appl. No. 17/368,143.
Notice of Allowance and Fees Due (PTOL-85) Mailed on Nov. 15, 2023 for U.S. Appl. No. 17/368,143, 7 page(s).
Office Action Appendix Mailed on Oct. 30, 2023 for U.S. Appl. No. 17/368,143, 4 page(s).
Requirement for Restriction/Election Mailed on Oct. 26, 2022 for U.S. Appl. No. 17/368,143.

\* cited by examiner

MODULAR VERTICAL LIFT SYSTEM

CROSS-REFERENCE TO RELATED APPLICATIONS

This application is a continuation of and claims priority to U.S. patent application Ser. No. 17/368,143, filed Jul. 6, 2021, the contents of which are incorporated herein by reference in its entirety.

TECHNOLOGICAL FIELD

Example embodiments of the present disclosure relate generally to a storage and retrieval system and, more particularly, to a vertical lift system used in a storage and retrieval system.

BACKGROUND

Picking loads in warehouse or distribution centers for order fulfillment can be been challenging. Different transportation systems pick loads from a source and transport them to a destination. The transportation systems may be, for example, conveying devices or transport devices. Generally, warehouses or distribution centers for storing loads may include a storage system that comprise a series of storage racks that are accessible by the transport devices such as, but not limited to, shuttles or vertical lifts or stacker cranes that are movable within aisles along the storage racks. These transport devices may be used for storing and retrieving of loads in or from a storage rack of the storage system. Generally, the transport devices are comprised of multiple components which may be positioned on a frame and outside the frame of the transport devices which works in synergy to control movement of the transport devices and the movement of the loads handled by the transport devices.

SUMMARY

The following presents a simplified summary to provide a basic understanding of some aspects of the disclosed material handling system. This summary is not an extensive overview and is intended to neither identify key or critical elements nor delineate the scope of such elements. Its purpose is to present some concepts of the described features in a simplified form as a prelude to the more detailed description that is presented later.

Various example embodiments described herein relate to a rack storage system including a plurality of storage levels, a load handling station provided on each storage level and a vertical lift mounted on a lift structure to transport loads to and from the load handling station. The lift structure includes a guide rail facilitates movement of the vertical lift between the storage levels and a pair of vertical posts positioned adjacent to the guide rail. The lift structure further includes a mounting platform attached in between the pair of vertical posts, wherein the loading handling station is secured to the mounting platform such that the vertical lift aligns with the load handling station by locating a position of the mounting platform on the lift structure while the vertical lift moves on the guide rail.

Various example embodiments described herein relate to a rack storage system, wherein the mounting platform is positioned orthogonally to the guide rail at predefined heights throughout a length of the vertical posts.

Various example embodiments described herein relate to a rack storage system, wherein the load handling station is a conveyor.

Various example embodiments described herein relate to a rack storage system, wherein the lift structure further includes: a power rail releasably attached to the guide rail to supply power to the vertical lift while moving on the guide rail.

Various example embodiments described herein relate to a rack storage system, wherein the load handling station includes at least one sensor to locate a position of the load handling station.

Various example embodiments described herein relate to a lift structure of a rack storage system including a pair of guide rails, a first pair of vertical posts, and a second pair of vertical posts positioned in parallel to the first pair of vertical posts. The pair of guide rails is positioned in between the first pair of vertical posts and the second pair of vertical posts. A mounting platform attached to one of the first pair of vertical posts or the second pair of vertical posts, wherein a load handling station is secured to the mounting platform to support loads transported to and from the rack storage system.

Various example embodiments described herein relate to a lift structure further includes a plurality of mounting platforms attached to one of the first pair of vertical posts or the second pair of vertical posts to support load handling stations at multiple storage levels of the rack storage system, wherein each mounting platform is installed at a predefined position throughout a length of the vertical posts.

Various example embodiments described herein relate to a lift structure, wherein the load handling station at each storage level is located using the predefined position of each mounting platform.

Various example embodiments described herein relate to a lift structure, wherein the pair of guide rails facilitates movement of the vertical lift between the storage levels.

Various example embodiments described herein relate to a lift structure, wherein the mounting platform includes one or more fastening points to align and fasten the load handling station to the mounting platform.

Various example embodiments described herein relate to a lift structure, wherein the load handling station includes at least one sensor to locate a position of the load handling station.

Various example embodiments described herein relate to a lift structure, wherein the pair of guide rails includes a first guide rail positioned in between the first pair of vertical posts and a second guide rail positioned in between the second pair of vertical posts.

Various example embodiments described herein relate to a lift structure including a clamping plate, a pair of guide rail portions stacked one on top of the other, and a mounting brace attached to a vertical post and the guide rail portions. The mounting brace includes an adjustment mechanism to adjust an alignment between the pair of guide rail portions fastened together by the clamping plate.

Various example embodiments described herein relate to a lift structure, wherein the guide rail portions are positioned parallel to the vertical post and perpendicular to the mounting brace.

Various example embodiments described herein relate to a lift structure, wherein the adjustment mechanism further includes alignment brackets slidably coupled with each other using one or more fasteners.

Various example embodiments described herein relate to a lift structure, wherein the alignment brackets are slidable laterally along one or more axes to adjust the alignment between the pair of guide rail portions.

Various example embodiments described herein relate to a lift structure, wherein the one or more fasteners comprise one of clamping bolts and nuts, jacking bolts and nuts or their combination.

Various example embodiments described herein relate to a lift structure, wherein multiple pairs of guide rail portions are stacked on top of each other to form a guide rail.

Various example embodiments described herein relate to a lift structure, wherein a vertical lift is guided over the guide rail.

Various example embodiments described herein relate to a lift structure, wherein the mounting brace is positioned along a length of the vertical post in between alternate pairs of guide rail portions.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which will be further described below.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Some embodiments of the present invention will now be described more fully hereinafter with reference to the accompanying drawings, in which some, but not all embodiments of the inventions are shown. Indeed, the disclosure may be embodied in many different forms and should not be construed as limited to the embodiments set forth herein; rather, these embodiments are provided so that this disclosure will satisfy applicable legal requirements. The terms "or" and "optionally" are used herein in both the alternative and conjunctive sense, unless otherwise indicated. The terms "illustrative" and "exemplary" are used to be examples with no indication of quality level. Like numbers refer to like elements throughout.

The components illustrated in the figures represent components that may or may not be present in various embodiments of the invention described herein such that embodiments may include fewer or more components than those shown in the figures while not departing from the scope of the invention.

Turning now to the drawings, the detailed description set forth below in connection with the appended drawings is intended as a description of various configurations and is not intended to represent the only configurations in which the concepts described herein may be practiced. The detailed description includes specific details for the purpose of providing a thorough understanding of various concepts with like numerals denote like components throughout the several views. However, it will be apparent to those skilled in the art that these concepts may be practiced without these specific details.

As used herein, the terms "pick-up" or "store" or "deposit" or "retrieve" may collectively refer to various operations performed by the vertical lifts and the autonomous vehicle in the rack storage system. Thus, use of any such terms should not be taken to limit the spirit and scope of embodiments of the present disclosure.

As used herein, the term "load handling station" may be used to refer to a pick-up and deposit (P&D) conveyor or infeed/outfeed conveyor or buffer conveyor which can support and convey loads using one or more conveying elements. Thus, use of any such terms should not be taken to limit the spirit and scope of embodiments of the present disclosure.

As used herein, the terms "guide track" or "guide rail" or "guide rail" may be used to refer to guideways or pathways through which the vertical lifts and the autonomous vehicle are guided to store and retrieve the loads. Thus, use of any such terms should not be taken to limit the spirit and scope of embodiments of the present disclosure.

As used herein, the terms "storage system", "retrieval system", "rack storage system", "automated storage and retrieval system" may be used to refer to any portion of a warehouse or a distribution center having multiple storage racks with a provision to store and retrieve one or more loads. Thus, use of any such terms should not be taken to limit the spirit and scope of embodiments of the present disclosure.

As used herein, the terms "plates", "braces", "brackets", "mounts", "side guide", "flanges", "side rail", "beading" may be used to refer to structural elements with provisions to mechanically couple with other structural elements of a mechanical system or an electrical system.

As used herein, the terms "loads" or "load" may be used to refer to items, products, articles, packages, baggage, luggage, storage containers such as trays, totes, cartons, boxes, or pallets. Thus, use of any such terms should not be taken to limit the spirit and scope of embodiments of the present disclosure.

Generally, a storage and retrieval system may be provided as a two-dimensional or three-dimensional storage and retrieval system. Such storage and retrieval system are often referred to as Automated Storage and Retrieval System (ASRS or AS/RS). In such automated storage and retrieval system, throughput is always a concern due to increase in storage and retrieval times. Further, retrieving loads from the storage racks in a quick and efficient manner has been a constraint in most of the automated storage and retrieval system. Typically, the transport devices may be movable in vertical directions and horizontal directions within the aisles which is defined between two adjacent storage racks for storing and retrieving the loads. Each storage rack may be of a predefined height configured with multiple storage levels with predefined depth to store the loads picked up by the transport devices. One such transport device which can move vertically at different heights between the multiple storage levels is a vertical lift.

In some examples, the loads transported to/from the storage levels are contained in storage containers such as trays, totes, cartons, boxes or on pallets. Depending on a storage capacity of the storage racks, the racks may be known as high density racks or ultra-high-density racks. Such storage containers are stored in the storage racks and retrieved from the storage racks using the vertical lift for performing operations such as, for example, order fulfilment or replenishment or building mixed pallets. While vertical lifts of various configurations have been proposed to store and retrieve the loads or storage containers for fulfilling such operations in a warehouse or a distribution center, the prior known configurations of the vertical lifts have certain drawbacks during installation and maintenance of the vertical lifts. Some of the considerations while designing the configurations of the vertical lifts to overcome the prior drawbacks are: minimize the storage and retrieval time; maximize safety in handling loads during storage and retrieval by minimizing slippage, misalignment and jam, minimize wear and tear of components of the vertical lifts by modifying the configuration/arrangement to handle overload, stress, vibrations, derailing and other external factors affecting the lifespan and safety of the vertical lifts and its components, modular vertical lift structure, reduce labor for installation/maintenance with easy to mount components on the vertical lift structure.

Through applied effort, ingenuity, and innovation, many of the above identified problems have been solved by developing solutions that are included in embodiments of the present disclosure, many examples of which are described in detail herein. The present disclosure relates to a vertical lift mounted on a lift structure which includes a mounting platform. A load handling station is secured to the mounting platform to support loads transported to and from vertical lift. The vertical lift aligns with the load handling station by locating a position of the mounting platform on the lift structure. Such a configuration may enable both the vertical lift and the load handling station to be supported on a common lift structure ensuring minimal effort during installation of the lift structure in a rack storage system. According to an embodiment, the lift structure includes a mounting brace with an adjustment mechanism to adjust an alignment between guide rail portions mounted on the lift structure on which the vertical lift is guided. The adjustment mechanism may ensure proper error free installation and alignment of the guide rail portions on the lift structure. According to an embodiment, the mounting brace and the mounting platform may be attached to vertical masts of the lift structure.

According to an embodiment, the mounting platform is positioned perpendicular to the mounting brace when attached to the vertical masts.

According to an embodiment, the guide rail portions are positioned parallel to the vertical posts and perpendicular to the mounting brace.

According to an embodiment, the adjustment mechanism includes alignment brackets that are slidable laterally along one or more axes to adjust the alignment between the pair of guide rail portions.

In the following detailed description of exemplary embodiments of the disclosure, specific representative embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

Throughout this specification, the terms 'conveyors' or 'conveyor devices' or 'conveyor system' may be used interchangeably and these terms should be taken as an example of both roller conveyor, a belt conveyor, or their combination.

Throughout this specification, the terms 'rollers' or 'conveyor rollers' may be used interchangeably and the term 'belt' or 'conveyor belt' may be used interchangeably and should be taken as an example of a medium which transports loads on the conveyor system.

Throughout this specification, the terms 'lift structure' or 'vertical lift structure' may be used interchangeably and should be taken as an example of a mechanical structure on which the vertical lift is installed.

Throughout this specification, the terms 'storage and retrieval system' or 'rack storage system' may be used interchangeably and should be taken as an example of a system having storage racks.

Generally, storage and retrieval system operate under computerized control, maintaining an inventory of stored loads. Retrieval of loads is accomplished by specifying the load type and quantity to be retrieved. The computer determines where in the storage area the load can be retrieved from and schedules the retrieval. The autonomous vehicles and the vertical lifts are sometimes part of the storage and retrieval system. In some storage and retrieval system, the horizontal movement in the storage racks within the system is made by independent shuttles each operating on one level of the storage rack while the vertical lift at a fixed position within the storage rack is responsible for the vertical movement. In some storage and retrieval system, the autonomous vehicle picks up or drops off loads at specific load handling stations in the storage area provided along with the storage rack. Inbound and outbound loads are precisely positioned for proper handling in the load handling stations. Various aspects of the present disclosure are described in connection with a lift structure used with the vertical lifts and the load handling stations of the storage and retrieval system.

Figure 1:
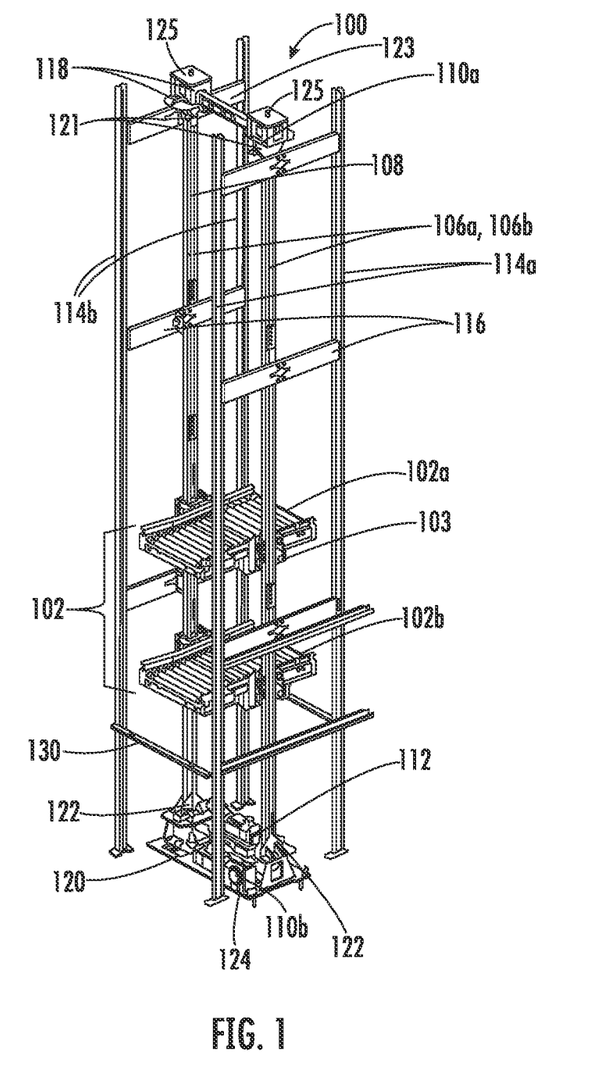
FIG. 1 discloses a perspective view of a dual conveyor carriage on a vertical lift structure, in accordance with an embodiment of the present invention.
Figure 4:
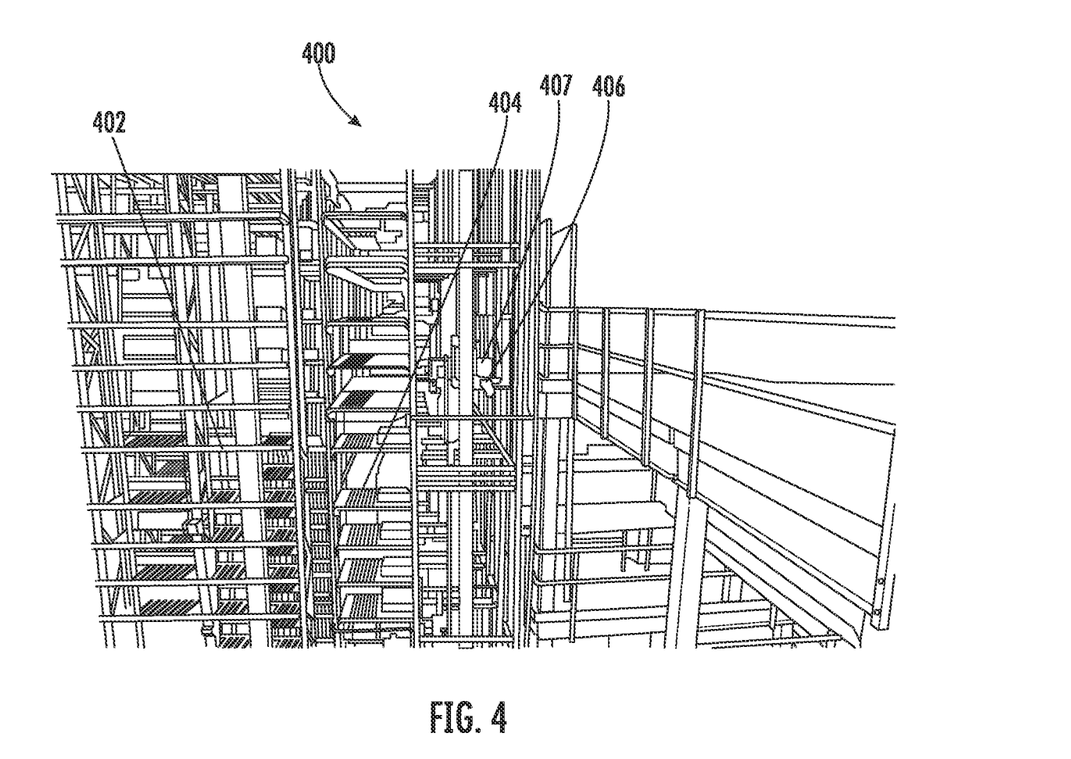
FIG. 4 discloses a perspective view of a rack storage system in which the vertical lift structure of FIG. 1 is installed, in accordance with an embodiment of the present invention.

Referring now specifically to the drawings and the illustrative embodiments depicted therein, FIG. 1 discloses a perspective view of a dual conveyor carriage on a vertical lift structure, in accordance with an embodiment of the present invention, in accordance with an embodiment of the present invention. The dual conveyor carriage 102 along with a lifting unit 103 is mounted to the vertical lift structure 100 to form the vertical lift. The dual conveyor carriage 102 and the lifting unit 103 is guided on dual guide rails 106a, 106b, one rail 106a installed in parallel with the other rail 106b with two conveyor carriages 102 positioned in between the rails. FIG. 1 includes two conveyor carriages 102 independently movable on guide rails 106a, 106b to handle loads stored in the storage racks of the storage and retrieval system, however, it is conceivable to use a single conveyor carriage on the vertical lift structure 100. According to an embodiment, a first conveyor carriage 102a and a second conveyor carriage 102b on the vertical lift structure 100 may pick up and deposit the loads between the load handling stations on the storage racks and outfeed stations/infeed stations. In some examples, the first conveyor carriage 102a may be employed to pick and deposit the loads at load handling stations of a first set of storage levels and the second conveyor carriage 102b may be employed to pick and deposit the loads at load handling stations of a second set of storage levels. In some examples, both the first conveyor carriage 102a and the second conveyor carriage 102b may be employed to pick and deposit the loads at the load handling stations of any of the storage levels of the storage rack. In some examples, the first conveyor carriage 102a may pick the loads from the infeed station and deposit the loads at a load handling station of a selected storage level and the second conveyor carriage 102b may pick the loads from the load handling station of the selected storage level and deposit the loads at the outfeed station. In some examples, both the first conveyor carriage 102a and the second conveyor carriage 102b may simultaneously pick and deposit the loads from or to the load handling station, the infeed station, and the outfeed station. In some examples, both the first conveyor carriage 102a and the second conveyor carriage 102b may pick the loads from the infeed station and deposit the load at a common load handling station at a selected storage level without collision between the first conveyor carriage 102a and the second conveyor carriage 102b. Similarly, both the first conveyor carriage 102a and the second conveyor carriage 102b may pick the loads from the common load handling station at the selected storage level and deposit the loads at the outfeed station without collision between the first conveyor carriage 102a and the second conveyor carriage 102b. Such configurations of the dual conveyor carriages 102 operating in the storage and retrieval system to pick and deposit the loads without any collision is disclosed in U.S. Pat. No. 10,611,568, incorporated herein as a reference. A perspective view of a rack storage system with the storage racks and the load handling stations is shown in FIG. 4.

According to an embodiment, the first conveyor carriage 102a and the second conveyor carriage 102b are driven independently using driving systems. The driving systems may include drive belts 108, drive pulleys 110a, 110b, and drive motors 112. The drive belts 108 are received for vertical rotation respectively on a pair of top drive pulleys 110a and received independently on a pair of bottom drive pulleys 110b, wherein the bottom drive pulleys 110b are driven by a pair of drive motors 112. The drive motors 112 independently rotate the bottom drive pulleys 110b to independently control movement of the first conveyor carriage 102a and the second conveyor carriage 102b. According to an embodiment, as shown in FIG. 1, the drive belts 108 are installed on the guide rails 106a, 106b. In FIG. 1, the drive belts 108 are installed on the parallel guide rails 106a, 106b, one drive belt on each guide rail 106a, 106b. According to an embodiment, the drive belts 108 facilitate the movement of the first conveyor carriage 102a and the second conveyor carriage 102b on the guide rails 106a, 106b under the influence of the drive motors 112. In some examples, the drive motors 112 include a motor encoder to track a position of the first conveyor carriage 102a and the second conveyor carriage 102b when guided on the guide rails 106a, 106b. According to an embodiment, as shown in FIG. 1, each guide rail 106a, 106b is mounted to a pair of vertical mast 114. For example, a first guide rail 106a may be positioned in between a first pair of vertical mast 114a and a second guide rail 106b positioned in between a second pair of vertical mast 114b. The first guide rail 106a and the second guide rail 106b mounted to the first pair of vertical mast 114a and the second pair of vertical mast 114b respectively using a mounting brace 116. According to an embodiment, multiple mounting braces 116 may be installed throughout a length of the vertical masts 114a, 114b. A sectional view of one portion of the lift structure with mounting braces is shown in detail in FIG. 2. According to an embodiment, the lift structure includes a mounting platform 130 attached to the vertical masts 114a, 114b. The mounting platform 130 may be positioned on the vertical masts 114a, 114b perpendicular to the mounting brace 116. A sectional view of one portion of the lift structure with mounting platforms is shown in detail in FIG. 2. According to an embodiment, the mounting brace 116 and the mounting platform 130 are fastened to the vertical masts 114a, 114b by using suitable fasteners secured within plurality of punctured holes 111 provided throughout a length of the vertical masts 114a, 114b.

According to an embodiment, the first guide rail 106a and the second guide rail 106b are mounted to a pair of top housings 118 and a bottom housing 120 common for the first guide rail 106a and the second guide rail 106b. For example, one end of the first guide rail 106a and the second guide rail 106b may be attached to a first set of attachment plates 121 on the pair of top housings 118 and other end of the first guide rail 106a and the second guide rail 106b may be attached to a second set of attachment plates 122 on the bottom housing 120, wherein the attachment plates 121, 122 ensures proper alignment of the first guide rail 106a and the second guide rail 106b. In some examples, the bottom housing 120 may include components such as the drive motors 112, bottom drive pulleys 110b, bearings (not shown), and bottom spreader 124. In some examples, the pair of top housings 118 may include components such as the top drive pulleys 110a, bearings (not shown), top spreader 123, and a pair of access plates 125 for maintenance of the components inside the top housings 118. According to an embodiment, the first conveyor carriage 102a and the second conveyor carriage 102b positioned in between the top housings 118 and the bottom housing 120 are driven independently using the components inside the top housings 118 and the bottom housing 120. According to an embodiment, the first conveyor carriage 102a and the second conveyor carriage 102b may be positioned in the vertical lift structure having a single common guide rail without any housings for the components as disclosed in U.S. Pub. No. 20200071074 incorporated herein for reference.

Figure 2:
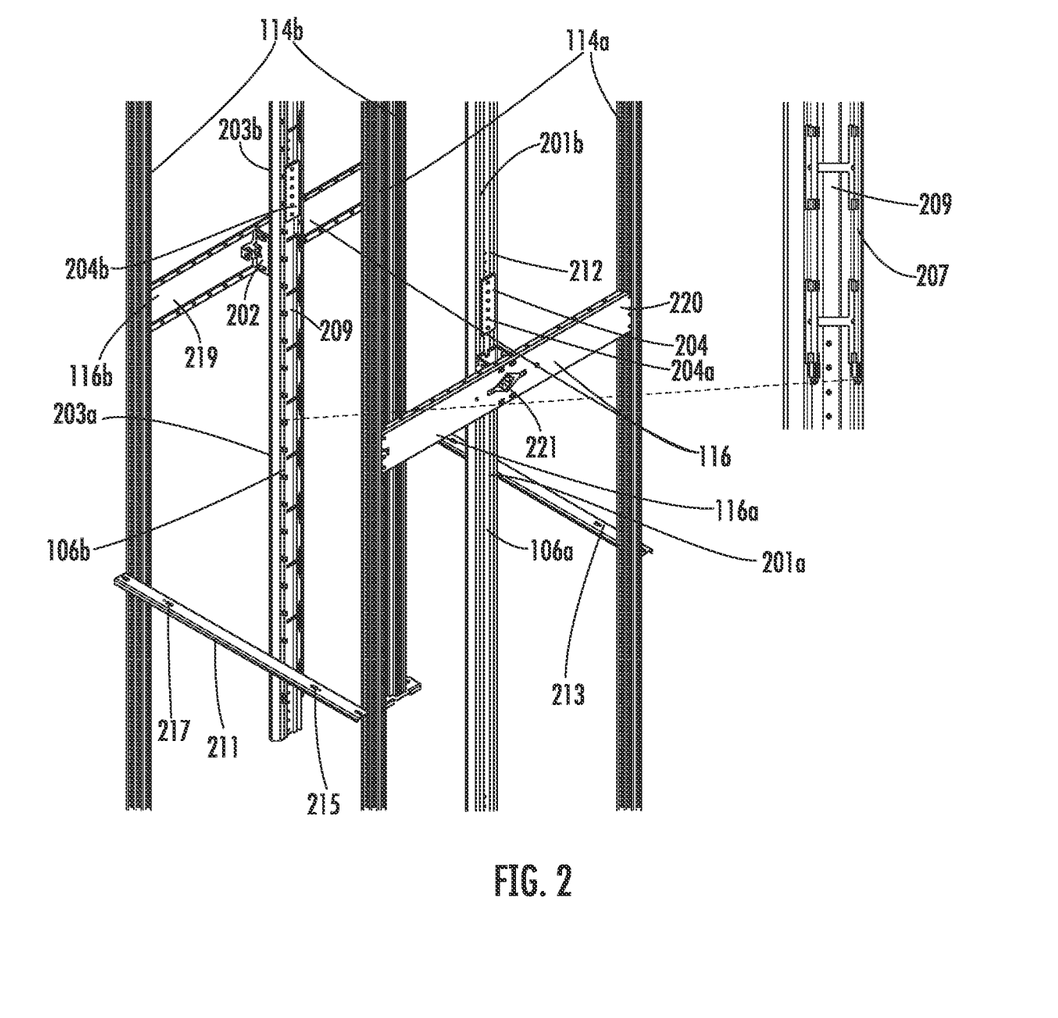
FIG. 2 discloses a sectional view of the vertical lift structure of FIG. 1, in accordance with an embodiment of the present invention.

FIG. 2 discloses a sectional view of the vertical lift structure of FIG. 1, in accordance with an embodiment of the present invention. As shown in FIG. 2, the mounting braces 116 are attached to the vertical posts 114a, 114b and the guide rails 106a, 106b. For example, a first mounting brace 116a is positioned in between the first pair of vertical posts 114a and a second mounting brace 116b is positioned in between the second pair of vertical posts 114b. According to an embodiment, multiple first mounting braces 116a and multiple second mounting braces 116*b* may be positioned throughout a length of the vertical posts 114*a*, 114*b* at predefined intervals. According to an embodiment, the mounting braces 116*a*, 116*b* are attached to the guide rails 106*a*, 106*b*. According to an embodiment, the guide rails 106*a*, 106*b* are attached to the vertical posts 114*a*, 114*b* via the mounting braces 116*a*, 116*b*. According to an embodiment, the mounting braces 116*a*, 116*b* include adjustment mechanism 202 to adjust an alignment between guide rail portions of the guide rails 106*a*, 106*b*. For example, each guide rail 106*a*, 106*b* are formed by multiple guide rail portions stacked on top of the other. According to an embodiment, the stacked guide rail portions of each guide rail 106*a*, 106*b* are clamped together using a clamping plate 204. For example, a first clamping plate 204*a* is provided to clamp a second guide rail portion 201*a* with a first guide rail portion 203*a* stacked on top of the second guide rail portion 201*a*. The two guide rail portions 201*a*, 203*a* are attached to the first pair of vertical mast 114*a* through the mounting brace 116*a*. On the other hand, a second clamping plate 204*b* is provided to clamp a second guide rail portion 201*b* with a first guide rail portion 203*b* stacked on top of the second guide rail portion 201*b*. The two guide rail portions 201*b*, 203*b* are attached to the first pair of vertical mast 114*b* through the mounting brace 116*b*. Often, when the guide rail portions 201*a*, 201*b*, 203*a*, 203*b* are stacked one top of the other to form the guide rails 106*a*, 106*b*, there might exist a possibility of misalignment between the guide rail portions 201*a*, 201*b*, 203*a*, 203*b*. Such misalignments are overcome by the adjustment mechanism 202 provided on each of the mounting braces 116*a*, 116*b*. As shown in FIG. 2, the adjustment mechanism 202 of the mounting braces 116*a*, 116*b* are attached to the guide rails 106*a*, 106*b* at an attachment region below the clamping plates 204*a*, 204*b*, however, conceivable are other arrangements in which the adjustment mechanism 202 may be attached to the clamping plates 204*a*, 204*b* which in turn is attached to the attachment region of the guide rails 106*a*, 106*b*. According to an embodiment, the adjustment mechanism 202 on the mounting brace 116 may be used for clamping and aligning the guide rail portions 201*a*, 201*b*, 203*a*, 203*b* without a requirement of the clamping plate 204. According to an embodiment, each guide rail 106*a*, 106*b* includes a power rail 207 attached to an inner surface 209 of the guide rail 106*a*, 106*b*. The power rail 207 is used for providing power and communication to the conveyor carriages 102*a*, 102*b* when moving on the guide rails 106*a*, 106*b*. For example, the power rail is mounted using mounting clamps 210 on the inner surface 209 of the guide rails 106*a*, 106*b*. For example, the conveyor carriages 102*a*, 102*b* may include conductor shoes which may come in contact with the power rail 207 when moving on the guide rails 106*a*, 106*b* to provide the power and communication to the conveyor carriages 102*a*, 102*b*. According to an embodiment, the clamping plate 202 and the mounting brace 116 are attached an outer surface 212 of the guide rails 106*a*, 106*b*. According to an embodiment, the mounting brace 116 includes an outer surface 220 and an inner surface 219. The adjustment mechanism 202 is attached to the inner surface 219 and the outer surface 220 includes an opening 221 to access the adjustment mechanism 202. The mounting brace 116 and the adjustment mechanism 202 are explained in detail in conjunction with FIG. 3.

According to an embodiment, the mounting platform 130 is attached and positioned in between one post of the first pair of vertical posts 114*a* and one post of the second pair of vertical posts 114*b*. The mounting platform 130 may be positioned perpendicular to the guide rails 106*a*, 106*b* and the mounting brace 116. According to an embodiment, the mounting platform 130 is attached either to the first pair of vertical posts 114*a* or the second pair of vertical posts 114*b*. As shown in FIG. 2, a first mounting platform 211 and a second mounting platform 213 are attached to the vertical post 114*a*, 114*b* and positioned perpendicular to the mounting brace 116*a*, 116*b*. According to an embodiment, multiple mounting platforms may be installed throughout a length of the vertical posts 114*a*, 114*b*. The multiple mounting platforms may be positioned at predefined positions throughout a length of the vertical posts 114*a*, 114*b*. According to an embodiment, the load handling station is secured to each mounting platform 211, 213 to support loads transported to and from the rack storage system. According to an embodiment, each mounting platform 211, 213 comprises one or more fastening points 215, 217 to secure the load handling station. For example, the one or more fastening points may be a pair of longitudinal openings 215, 217 to slidably align and fasten the load handling station to the mounting platforms 211, 213. The use of mounting platforms 211, 213 on the vertical lift structure 100 in conjunction with the load handling station is explained in detail in FIG. 5.

Figure 3:
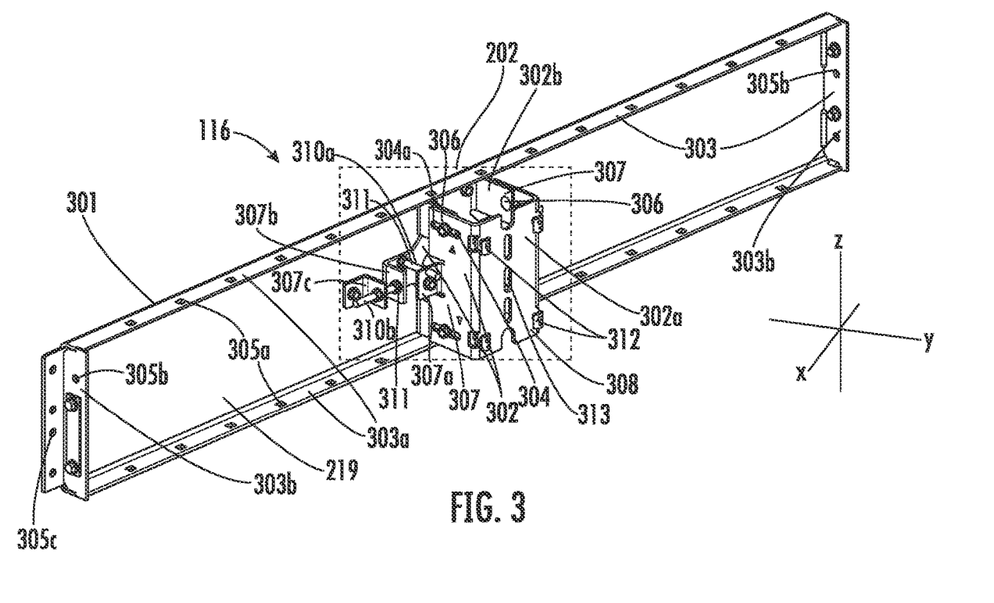
FIG. 3 discloses a perspective view of an attachment mechanism of a mounting brace of FIG. 2, in accordance with an embodiment of the present invention.

FIG. 3 discloses a perspective view of the adjustment mechanism 202 of the mounting brace 116 of FIG. 2, in accordance with an embodiment of the present invention. FIG. 3 shows a view of the inner surface 219 of the mounting brace 116 to which the adjustment mechanism 202 is attached. According to an embodiment, the mounting brace 116 may include a rectangular beading 301 provided on the inner surface 219 of the mounting brace 116. In some example, the rectangular beading 301 may be a single molded piece attached to the inner surface 219 of the mounting brace 116. In some examples, the rectangular beading 301 may be formed integrally on the mounting brace 116 as a protrusion from the inner surface 219 of the mounting brace 116. In some examples, the rectangular beading 301 may be formed by attaching two pairs of attachment plates 303 to the inner surface 219 of the mounting brace 116. The two pair of attachment plates 303 may be secured to each other using suitable fasteners or force/interference fits. When the two pairs of attachment plates 303 are fastened to the inner surface 219 of the mounting brace 116, one pair of attachment plates 303*a* may be positioned perpendicular to the other pair of pair of attachment plates 303*b* forming the rectangular beading 301 on the inner surface 219. According to an embodiment, the rectangular beading 301 includes one or more apertures. For example, the one or more apertures may be provided on the two pairs of attachment plates 303 and positioned equidistant to each other. For example, a first set of apertures 305*a* may be provided on one pair of attachment plates 303*a* and a second set of apertures 305*b* may be provided on other pair of attachment plates 303*b*. According to an embodiment, the adjustment mechanism 202 may be positioned in between the two pairs of attachment plates 303. According to an embodiment, the second set of apertures 305*b* may be used for mounting the mounting brace 116 to the vertical masts 114*a*, 114*b*. According to an embodiment, a third of apertures 305*c* may be provided on the mounting brace 116 for additional support for the mounting brace 116 on the vertical masts 114*a*, 114*b*. In some examples, the mounting brace 116 may be attached to the vertical masts 114*a*, 114*b* using the second set of apertures 305*b* and the third of apertures 305*c* in combination with suitable fasteners.

According to an embodiment, the adjustment mechanism 202 includes alignment brackets 302 that are slidable laterally along one or more axes to adjust the alignment between a pair of guide rail portions 201a, 201b or 203a, 203b as shown in FIG. 2. As shown in FIG. 3, the adjustment mechanism 202 includes a pair of alignment brackets (i.e., a first alignment bracket 302a and a second alignment bracket 302b). According to an embodiment, the alignment brackets 302 are slidably attached to each other and with the rectangular beading 301. As shown in FIG. 3, the first alignment bracket 302a and the second alignment bracket 302b are slidably coupled to each other using mating grooves 304 and suitable fasteners 306. A first pair of mating grooves 304a may be provided integrally on the first alignment bracket 302a and a second pair of mating grooves 304b (not shown) may be provided integrally on the second alignment bracket 302b. In some examples, the first pair of mating grooves 304a and the second pair of mating grooves 304b may be formed on opposing side surfaces 307 of the alignment brackets 302a, 302b and may extend in the 'Y' axis substantially along a width of the opposing side surfaces 307. In some examples, the suitable fasteners 306 may be jacking bolts, clamping bolts, screws, nuts, washers, or their combination. The first pair of mating grooves 304a may be coupled with the second pair of mating grooves 304b using the suitable fasteners 306 such that the first alignment bracket 302a may slide with respect to the second alignment bracket 302b. As shown in FIG. 3, the first alignment bracket 302a and the second alignment bracket 302b may include a first flange 307a and a second flange 307b respectively extending from the opposing side surfaces 307 of the alignment brackets 302a, 302b. The first flange 307a and the second flange 307b includes integrally drilled holes (not shown) through which the suitable fasteners 306 are inserted to couple the flanges 307a, 307b together. In some examples, a third flange 307c attached to the inner surface of the mounting brace 116 may be provided to couple with the second flange 307b through the drilled holes and the suitable fasteners 306. In some examples, the first flange 307a and the second flange 307b are molded integrally on the opposing side surfaces 307 of the alignment brackets 302a, 302b. In this manner, the first alignment bracket 302a and the second alignment bracket 302b are coupled to each other using the mating grooves 304 and the suitable fasteners 306. According to an embodiment, the first alignment bracket 302a includes additional groves 313 provided on a front surface 308 of the bracket 302a to enable attachment of the clamping plate 204 to the bracket 302a. The opposing side surfaces 307 are at right angles to the front surface 308. Further, as shown in FIG. 3, the second alignment bracket 302b is slidably attached with the rectangular beading 301. For example, the second alignment bracket 302b is slidably attached to the pair of attachment plates 303a through the first set of apertures 305a. For example. the second alignment bracket 302b may be fixed inside one or more apertures of the first set of apertures 305a with a clearance to slide the second alignment bracket 302b within the one or more openings. In some examples, the second alignment bracket 302b may be attached to the one or more apertures of the first set of apertures 305a in a manner similar to the attachment between the first alignment bracket 302a and the second alignment bracket 302b using the mating groves 304 and the suitable fasteners 306. In this manner, the first alignment bracket 302a and the second alignment bracket 302b are slidably coupled to each other and with the rectangular beading 301. The manner in which the alignment brackets 302a, 302b are fastened should be constructed as one example of enabling a slidable coupling between the alignment brackets 302a, 302b and the rectangular beading 301, therefore, may not be construed as limiting the scope of the disclosure. Any alternate arrangement or use of any suitable fasteners for fastening the alignment brackets 302a, 302b and the rectangular beading 301 to achieve the object of slidable coupling may be employed and may fall within the scope of the disclosure.

According to an embodiment, the alignment of the pair of guide rail portions 201a, 201b or 203a, 203b in the 'X' axis and the 'Y' axis may be adjusted by a slidable movement of the alignment brackets 302. In the example, as shown in FIG. 3, the slidable movement of the first alignment bracket 302a and the second alignment bracket 302b is enabled using jacking bolts 310a, 310b. As discussed previously, the first alignment bracket 302a, the second alignment bracket 302b, the rectangular beading 301 are slidable coupled to each other using the mating grooves 304a, 304b, the first set of apertures 305a, the flanges 307a, 307b, 307c along with the suitable fasteners 306. The jack bolts 310a, 310b are inserted through the flanges 307a, 307b, 307c and rotated in a clockwise or an anti-clockwise direction to slide the first alignment bracket 302a and the second alignment bracket 302b in both the 'X' axis and the 'Y' axis. The sliding movement of the first alignment bracket 302a and the second alignment bracket 302b in turn adjusts the alignment of the pair of guide rail portions 201a, 201b or 203a, 203b in the 'X' axis and the 'Y' axis. According to an embodiment, at least one attachment bracket 302a, 302b may be detachably attached to the pair of guide rail portions 201a, 201b or 203a, 203b to adjust the alignment. In the example, as shown in FIG. 3, the first alignment bracket 302a is attached to the pair of guide rail portions 201a, 201b or 203a, 203b using pairs of clips 312. The pair of clips, for example, may be flexible or rigid. The pairs of clips 312 may be clipped on to the guide rail portions 201a, 201b or 203a, 203b to couple the alignment brackets 302a, 302b with the guide rail portions 201a, 201b or 203a, 203b. The pairs of clips 312 may be provided such that the installation of the mounting brace 116 with the pair of guide rail portions 201a, 201b or 203a, 203b is commissioned at case with speedy attachment and detachment. According to an embodiment, the alignment of the pair of guide rail portions 201a, 201b or 203a, 203b in the 'Y' axis is enabled by a first jack bolt 310a. For example, the first jack bolt 310a is inserted into the drilled holes of the flanges 307a, 307b and rotated in one of the clockwise or the anti-clockwise direction to incrementally slide the first mounting bracket 302a with respect to the second mounting bracket 302b in the 'Y' axis. The incremental sliding is enabled by the mating grooves 304a, 304b positioned in an overlapping arrangement using the suitable fasteners 306, for example, clamping bolts and nuts. According to an embodiment, the alignment of the pair of guide rail portions 201a, 201b or 203a, 203b in the 'X' axis is enabled by a second jack bolt 310b. For example, the second jack bolt 310b is inserted into the drilled holes of the flanges 307b, 307c and rotated in one of the clockwise or the anti-clockwise direction to incrementally slide the second mounting bracket 302a with the first mounting bracket 302a in the 'X' axis within the first set of apertures 305a. It is to be noted that the first mounting bracket 302a slides along with the second mounting bracket 302b as these mounting brackets 302a, 302b are coupled with each other. Therefore, when the second jack bolt 310b is rotated, the second mounting bracket 302b slides within the first set of apertures 305a on the rectangular beading 301 to enable the mounting bracket 302a, 302b in the 'X' axis. According to an embodiment, the first jack bolt 310a and the second jack bolt 310b may be used in conjunction with locking nuts 311 to enable the jacks bolts 310a, 310b to be locked in position after the rotation in the clockwise or the anti-clockwise direction. In this manner, the jack bolts 310a, 310b enable the sliding movement of the mounting brackets 302a, 302b which in turn changes the alignment of the pair of guide rail portions 201a, 201b or 203a, 203b. Therefore, the mounting brace adjusts the alignment between pairs of guide rail portions positioned distributed along a length of the vertical masts while pairs of guide rail portions are coupled using the clamping plates.

Figure 5:
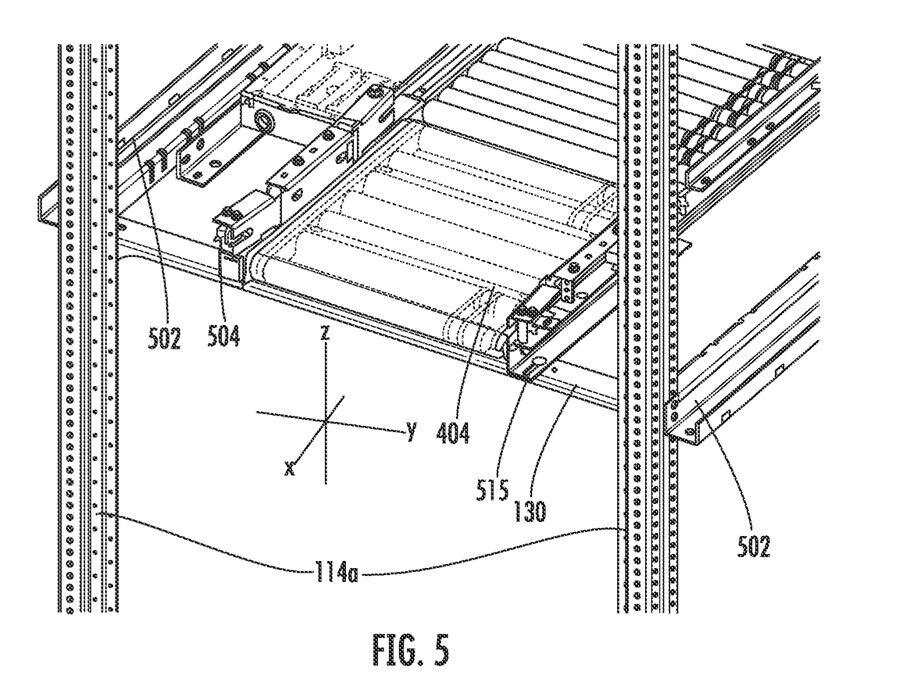
FIG. 5 discloses a sectional view of one load handling station installed in the rack storage system of FIG. 4, in accordance with an embodiment of the present invention.

FIG. 4 discloses a perspective view of a rack storage system 400 in which the vertical lift structure 100 of FIG. 1 is installed, in accordance with an embodiment of the present invention. The rack storage system 400 include multi-level storage racks 402, load handling stations 404, a vertical lift 406 with a conveyor carriage 102, and an autonomous vehicle (not shown). According to an embodiment, multiple autonomous vehicles, each servicing storage racks 402 at one storage level or storage racks 402 at multiple storage levels may be employed. According to an embodiment, the vertical lift structure 100 including the vertical lift 406 may be installed adjacent to the load handling stations 404. In some examples, one load handling station 404 may be provided at each storage level which may be located adjacent the storage racks 402. The vertical lift 406 may deposit a load 407 at a selected load handling station 404 of a selected storage level and the load 407 may then be picked by the autonomous vehicle to store the load 407 at a selected storage rack 402. According to an embodiment, the autonomous vehicle may travel laterally or vertically on guide tracks 502 as shown in FIG. 5 within the rack storage system 400 to reach the selected storage rack 402. According to an embodiment, the vertical lift 406 may retrieve the load 407 deposited by the autonomous vehicle at the load handling station 404. Therefore, the load handling stations 404 may handle loads 407 which are to be stored in the storage racks 402 or retrieved from the storage racks 402. According to an embodiment, the load handling stations 404 may include one or more conveying elements to support and transfer the load 407 deposited or retrieved by the vertical lift 406 or the autonomous vehicle. Often, the load handling stations 404 may be installed with the storage racks 402 of the rack storage system 400 and the vertical lift 406 may be configured to calibrate with positions of the load handling stations 404 spread across the storage levels. Such calibration may be tedious with change in configurations or arrangements of the rack storage system. According to an embodiment, the load handling stations 404 are installed on the mounting platforms 130, 211, 213 provided with the vertical lift structure 100 of FIG. 1. Such mounting platforms 130, 211, 213 may be provided at known positions on the vertical lift structure 100. The known positions of the mounting platforms 130, 211, 213 allow the vertical lift 406 to align with the load handling stations 404. In other words, the vertical lift 406 may be pre-calibrated or pre-configured with the known positions of the mounting platforms 130, 211, 213 which would remain constant irrespective of the configuration of the rack storage system.

FIG. 5 shows a sectional view of one of the load handling station 404 installed on one of the mounting platforms 130, 211, 213 of the vertical lift structure 100. In the FIG. 5, the mounting platform 130 is positioned in between either the first pair of vertical posts 114a or the second pair of vertical posts 114b. According to an embodiment, the mounting platform 130 may be positioned in between the guide tracks 502 of the autonomous vehicle. In the FIG. 5, two guide tracks 502 one on each side of the mounting platform 130 is shown. The guide tracks 502 are fastened to the pair of vertical posts 114a. According to an embodiment, the load handling station 404 may be slidably coupled to the mounting platform 130 using the one or more fastening points 215, 217. For example, the one or more fastening points 215, 217 may be a pair of longitudinal openings 215, 217 as shown in FIG. 2. Such longitudinal openings 215, 217 are provided such that the load handling station 404 may be aligned with an adjacent storage rack at a particular storage level. For example, the longitudinal openings 215, 217 may enable the 'Y' axis sliding movement of the load handling station to align with the adjacent storage rack. According to an embodiment, the load handling station 404 may include one or more additional fastening points 515, 517 for coupling with the mounting platform 130. For example, the one or more additional fastening points 515, 517 may be a pair of additional openings 515, 517 (not shown) transverse to the longitudinal openings 215, 217. For example, the pair of additional openings 515, 517 may enable the 'X' axis sliding movement of the load handling station 404 to align with the adjacent storage rack. According to an embodiment, the longitudinal openings 215, 217 may mate with the additional openings 515, 517 and coupled together using suitable fasteners known in the art. In this manner, the load handling station 404 may be slidably coupled to the mounting platform 130 and accurately aligned with the adjacent storage rack by sliding in both the 'X' axis and the 'Y' axis. According to an embodiment, a position of the mounting platform 130 on the vertical masts 114a may be known. For example, the mounting platform 130 may be located at a predetermined distance with reference to a floor at which the vertical lift structure 100 may be installed. The predetermined distance may be pre-programmed in the vertical lift 406 before operating the vertical lift 406 in the rack storage system 400. For example, the vertical lift 406 may consider the position of the mounting platform 130 as a reference point for locating the load handling platform 404. According to an embodiment, multiple mounting platforms 211, 213 may be attached to the vertical posts 114a, 114b to mount the load handling stations 404. In some examples, each mounting platform 211, 213 may be positioned at predetermined distances relative to the floor or at predetermined distances relative each other. Such predetermined distances may be pre-programmed in the vertical lift 406 before operating the vertical lift 406 in the rack storage system 400.

According to an embodiment, the vertical lift 406 may be pre-calibrated before mounting the load handling station 404 to the mounting platform 130. For example, the vertical lift may be guided on the vertical masts 114a, 114b under the influence of the driving systems as discussed in FIG. 1. The vertical lift 404 is then programmed to detect the mounting platform 130 using one or more sensors. The one or more sensors, for example, may be a diffused proximity sensor or a photoelectric retro-reflective sensor with a reflective surface on the mounting platform 130. After the vertical lift 404 detects the mounting platform 130, the position of the mounting platform 130 is recorded. In this manner, the position of all the mounting platforms 130, 211, 213 mounted throughout the length of the vertical masts 114a, 114b is pre-calibrated using the one or more sensors on the vertical lift 404. Such pre-calibration may be used for locating the position of each load handling platform 404 before operating the vertical lift 406 within the rack storage system 400. According to an embodiment, the load handling station 404 may be located dynamically by the vertical lift 406 while operating in the rack storage system 400. For example, the vertical lift 406 locates the load handling station 404 using a single sensor 504 when the vertical lift 406 travels on the guide rails 106a, 106b of the lift structure 100. The sensor 504, for example, may be a photoelectric through-beam sensor with transmitter of the sensor 504 located on the load handling station 404 and a receiver of the sensor 504 located on the vertical lift 406. When the receiver on the vertical lift 406 detects the light from the transmitter during the travel, the vertical lift 406 may be stopped at that position considering it to be the location of the load handling station 404. Alternatively, the transmitter of the sensor 504 may also be positioned on the mounting platform 130 to locate the load handling station 404. Therefore, the mounting platform may support the load handling station within the vertical lift structure and locate the load handling station when installed with the rack storage system.

The distributed control architecture and control logic for controlling the vertical lifts, the autonomous vehicle, and the load handling station are disclosed in FIGS. 6 and 7 of U.S. Pat. No. 10,611,568 incorporated herein for reference.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The foregoing description of an embodiment has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. Although only a limited number of embodiments of the invention are explained in detail, it is to be understood that the invention is not limited in its scope to the details of construction and arrangement of components set forth in the preceding description or illustrated in the drawings. The invention is capable of other embodiments and of being practiced or carried out in various ways. Also, in describing the embodiment, specific terminology was used for the sake of clarity. It is to be understood that each specific term includes all technical equivalents which operate in a similar manner to accomplish a similar purpose.

The invention claimed is:

1. A rack storage system comprising:
a plurality of storage levels;
a load handling station provided on each storage level;
a vertical lift mounted on a lift structure to transport loads to and from the load handling station, wherein the lift structure comprises:
a guide rail facilitates movement of the vertical lift between the storage levels;
a pair of vertical posts positioned adjacent to the guide rail; and
a mounting platform attached in between the pair of vertical posts, wherein the loading handling station is slidably secured to the mounting platform such that the vertical lift aligns with the load handling station by locating a position of the mounting platform on the lift structure while the vertical lift moves on the guide rail.

2. The rack storage system of claim 1, wherein the mounting platform is positioned orthogonally to the guide rail at one of a plurality of predefined heights throughout a length of the pair of vertical posts.

3. The rack storage system of claim 1, wherein the load handling station is a conveyor.

4. The rack storage system of claim 1, wherein the lift structure further comprises: a power rail releasably attached to the guide rail to supply power to the vertical lift while moving on the guide rail.

5. The rack storage system of claim 1, wherein the load handling station comprises at least one sensor to locate a position of the load handling station.

6. The rack storage system of claim 1, further comprising an autonomous vehicle configured to travel along an axis of a guide track within the rack storage system to reach a selected storage level.

7. The lift structure of claim 1, further comprises:
a second pair of vertical posts positioned in parallel to a first pair of vertical posts, wherein a pair of guide rails is positioned in between the first pair of vertical posts and the second pair of vertical posts; and
a plurality of mounting platforms attached to one of the first pair of vertical posts or the second pair of vertical posts to support load handling stations at multiple storage levels of the rack storage system, wherein each mounting platform is installed at a predefined position throughout a length of the vertical posts.

8. The lift structure of claim 7, wherein the load handling station at each storage level is located using the predefined position of each mounting platform.

9. The lift structure of claim 7, wherein the pair of guide rails facilitates movement of a vertical lift between the storage levels.

10. The lift structure of claim 1, wherein the mounting platform comprises one or more fastening points to align and fasten the load handling station to the mounting platform.

11. The lift structure of claim 1, wherein the load handling station comprises at least one sensor to locate a position of the load handling station.

12. The lift structure of claim 1, wherein the pair of guide rails comprises a first guide rail positioned in between the first pair of vertical posts and a second guide rail positioned in between the second pair of vertical posts.

13. The lift structure of claim 1, further comprising:
a clamping plate;
a pair of guide rail portions stacked one on top of the other; and
a mounting brace attached to a vertical post and the guide rail portions, wherein the mounting brace comprises:
an adjustment mechanism to adjust an alignment between the pair of guide rail portions fastened together by the clamping plate.

14. The lift structure of claim 13, wherein the guide rail portions are positioned parallel to the vertical post and perpendicular to the mounting brace.

15. The lift structure of claim 13, wherein the adjustment mechanism further comprises: alignment brackets slidably coupled with each other using one or more fasteners.

16. The lift structure of claim 15, wherein the alignment brackets are slidable laterally along one or more axes to adjust the alignment between the pair of guide rail portions.

17. The lift structure of claim 15, wherein the one or more fasteners comprise one of clamping bolts and nuts, jacking bolts and nuts or their combination.

18. The lift structure of claim 13, wherein multiple pairs of guide rail portions are stacked on top of each other to form a guide rail.

19. The lift structure of claim 18, wherein a vertical lift is guided over the guide.

20. The lift structure of claim 18, wherein the mounting brace is positioned along a length of the vertical post in between alternate pairs of guide rail portions.

* * * * *